United States Patent
Dickman (10) Patent No.: US 10,385,961 B2
(45) Date of Patent: Aug. 20, 2019

(54) PLANETARY GEAR SYSTEM

(71) Applicant: General Electric Company, Schenectady, NY (US)

(72) Inventor: Joseph Robert Dickman, Evendale, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/792,939

(22) Filed: Oct. 25, 2017

(65) Prior Publication Data
US 2019/0120368 A1    Apr. 25, 2019

(51) Int. Cl.
*F16H 57/04* (2010.01)
*F16H 57/08* (2006.01)

(52) U.S. Cl.
CPC ....... *F16H 57/0424* (2013.01); *F16H 57/043* (2013.01); *F16H 57/0445* (2013.01); *F16H 57/0471* (2013.01); *F16H 57/0479* (2013.01); *F05D 2230/64* (2013.01); *F16H 57/082* (2013.01)

(58) Field of Classification Search
None
See application file for complete search history.

(56) References Cited

U.S. PATENT DOCUMENTS

| | | | |
|---|---|---|---|
| 1,132,748 A * | 3/1915 | Sundh | F16H 57/0427 184/109 |
| 4,158,972 A * | 6/1979 | Chamberlain | F16H 1/46 475/337 |
| 5,472,383 A | 12/1995 | McKibbin | |
| 6,223,616 B1 | 5/2001 | Sheridan | |
| 6,381,948 B1 | 5/2002 | Klingels | |
| 7,967,712 B2 | 6/2011 | Nakamura | |
| 8,123,413 B2 | 2/2012 | Tambe | |
| 8,172,717 B2 | 5/2012 | Lopez | |
| 8,198,744 B2 | 6/2012 | Kern | |
| 8,235,861 B2 | 8/2012 | Lopez | |
| 8,287,423 B2 | 10/2012 | Lopez | |
| 8,298,114 B2 | 10/2012 | Lopez | |
| 8,459,872 B2 | 6/2013 | Nies | |
| 8,491,435 B2 | 7/2013 | Ghanime | |
| 8,506,446 B2 | 8/2013 | Minadeo | |
| 8,517,672 B2 | 8/2013 | McCooey | |
| 8,550,955 B2 | 10/2013 | Erno | |
| 8,550,957 B2 | 10/2013 | Erno | |
| 8,657,714 B1 | 2/2014 | Ghanime | |

(Continued)

FOREIGN PATENT DOCUMENTS

| CN | 201423259 Y | 3/2010 |
|---|---|---|
| CN | 103557312 A | 2/2014 |

(Continued)

*Primary Examiner* — Justin Holmes
(74) *Attorney, Agent, or Firm* — McGarry Bair PC (57) ABSTRACT

A planetary gear system is disclosed. The planetary gear system includes a carrier, a planet gear defining a central planet axis, a pin coupling the planet gear to the carrier and a bearing disposed between the planet gear and the pin. The bearing includes a plurality of rolling elements. Each of the rolling elements is in contact with an inner race and an outer race. The planet gear has a formed therein cooling passage for allowing a coolant to pass therethrough to cool the planet gear.

20 Claims, 7 Drawing Sheets

(56) References Cited

U.S. PATENT DOCUMENTS

| | | |
|---|---|---|
| 8,696,314 B2 | 4/2014 | Mashue |
| 8,727,629 B2 | 5/2014 | Do |
| 8,727,632 B2 | 5/2014 | Do |
| 8,753,243 B2 | 6/2014 | McCune |
| 8,777,802 B2 | 7/2014 | Erno |
| 8,857,192 B2 | 10/2014 | Huang |
| 8,899,916 B2 | 12/2014 | McCune |
| 8,904,746 B2 | 12/2014 | Fang |
| 9,121,491 B2 | 9/2015 | Hancox |
| 9,416,866 B2 | 8/2016 | Konruff |
| 9,593,674 B2 | 3/2017 | Boland |
| 2007/0010365 A1* | 1/2007 | Schmitt ............... F16H 57/0479 475/159 |
| 2009/0139799 A1* | 6/2009 | Tiwari ................ F16H 57/0431 184/6.12 |
| 2015/0267804 A1* | 9/2015 | Carlino .................. F16H 7/043 475/159 |
| 2015/0361962 A1* | 12/2015 | Hager ................... F16H 57/043 475/159 |

FOREIGN PATENT DOCUMENTS

| | | |
|---|---|---|
| CN | 203431144 U | 2/2014 |
| CN | 203560387 U | 4/2014 |
| CN | 101975268 B | 5/2014 |
| CN | 204459102 U | 7/2015 |
| CN | 104948721 A | 9/2015 |
| CN | 204628480 U | 9/2015 |
| CN | 204677738 U | 9/2015 |
| CN | 105202169 A | 12/2015 |
| CN | 205715603 U | 11/2016 |
| EP | 2083436 A2 | 11/2014 |

\* cited by examiner

PLANETARY GEAR SYSTEM

BACKGROUND

The present disclosure relates generally to a planetary gear system and more particularly relates to a cooling arrangement of a planetary gear system for use in gearboxes.

Gearboxes are used for power transmission in many systems such as, wind turbines, automobiles, aircraft and locomotives. A gearbox typically includes components such as a housing, shafts, bearings, and gears. Various gearbox designs are available to meet different speed transmission requirements. Of concern herein is an epicyclical gearbox including a planetary gear system, a sun gear and a ring gear.

In typical prior art, the planetary gear system is supplied with sufficient lubricant such as oil to reduce friction and provide wear protection for gear teeth, bearing surfaces, and other contacting surfaces in relative motion. For example, a set of spray bars may be used for supplying lubricant to the sun-to-planet and planet-to-ring meshes of the epicyclical gearbox. The lubricant is also a medium for conducting waste heat away from the planetary gear system.

It is desirable to remove the used lubricant as completely and quickly as possible, otherwise the gears may continually agitate the residual lubricant. Agitation of the residual lubricant degrades the power transmission efficiency of the gear system and elevates the lubricant temperature, making it more difficult to cool the lubricant to render it suitable for repeated use as a heat transfer medium.

Thus, am improved planetary gear system, would be desired in the art. For example, a planetary gear system with improved lubrication and cooling features would be advantageous.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION

One or more embodiments of the present disclosure will be described below. Unless defined otherwise, technical and scientific terms used herein have the same meaning as is commonly understood by one of skill in the art to which this disclosure belongs. The terms "a" and "an" do not denote a limitation of quantity, but rather denote the presence of at least one of the referenced items. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. Additionally, when using an expression of "about a first value–a second value," the about is intended to modify both values. In at least some instances, the approximating language may correspond to the precision of an instrument for measuring the value. Here, and throughout the specification and claims, range limitations may be combined and/or interchanged, such ranges are identified and include all the sub-ranges contained therein unless context or language indicates otherwise.

Figure 1:
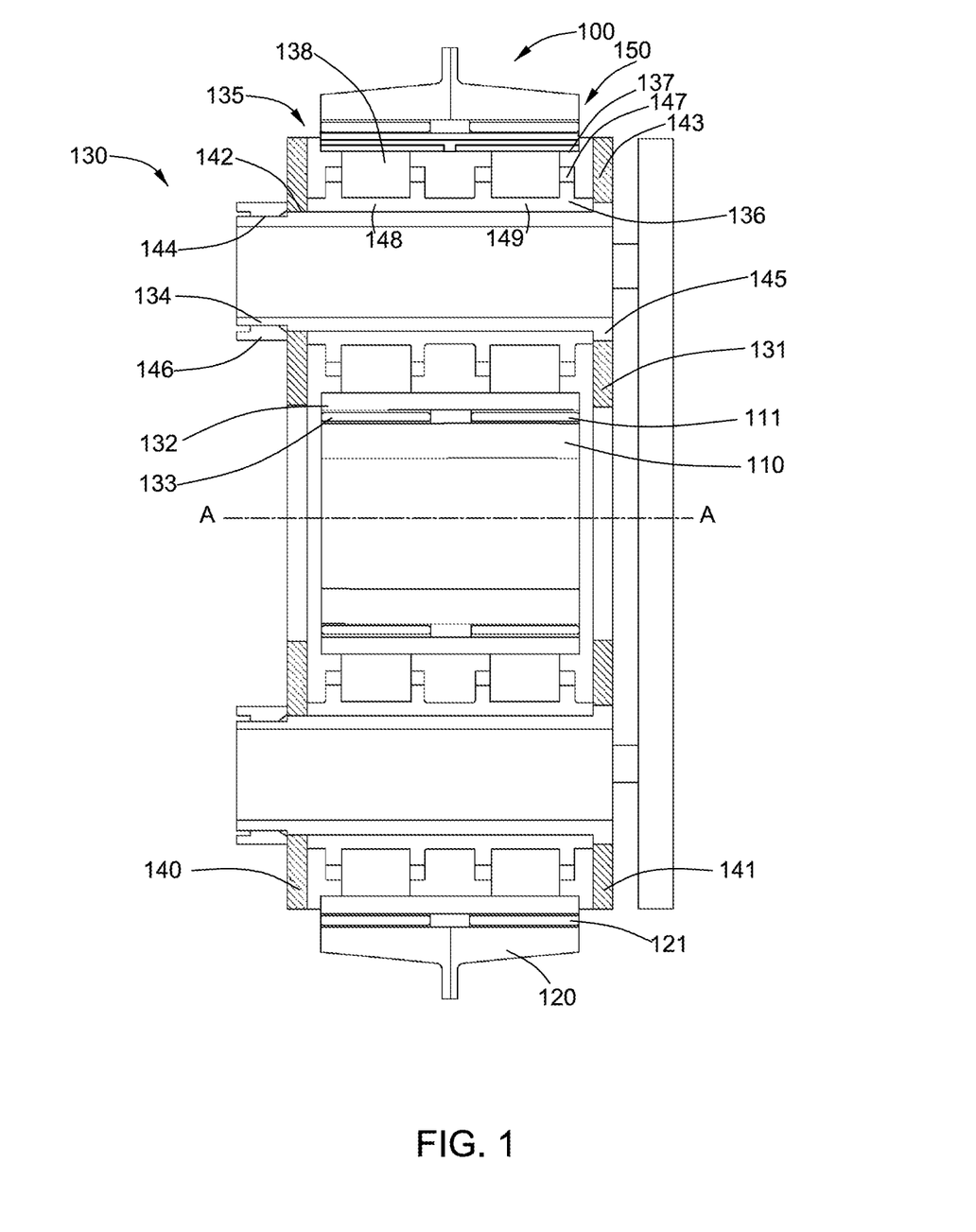
FIG. 1 is a schematic sectional view of a planetary gear according to one embodiment of the present disclosure.

FIG. 1 illustrates an epicyclic gearbox 100 constructed according to one embodiment of the present disclosure. The epicyclic gearbox 100 comprises a sun gear 110, a ring gear 120 and a planetary gear system 130. The planetary gear system 130 comprises a carrier 131, a planet gear 132, a pin 134, and a bearing 135. The bearing 135 is disposed between the planet gear 132 and the pin 134, and comprises an inner race 136, an outer race 137 and a plurality of rolling elements 138, each of the rolling elements 138 in contact with the inner race 136 and the outer race 137. The epicyclic gearbox 100 has a central axis "A" and the sun gear 110 is centrally-located. The sun gear 110 has a double-helical or "herringbone" pattern of gear teeth 111. A carrier 131 surrounds the sun gear 110 and carries an annular array of planet gears 132. In some embodiments, there are four planet gears 132. However, there is no limitation on the number of planet gears 132. Varying numbers of planet gears 132 may be used. Each planet gear 132 has a herringbone pattern of gear teeth 133. A ring gear 120 surrounds the planet gears 132 and also has a herringbone pattern of gear teeth 121. Collectively the sun gear 110, the planet gears 132, and the ring gear 120 constitute a gear train. Each of the planet gears 132 meshes with both the sun gear 110 and the ring gear 120. The sun gear 110, planet gears 132, and ring gear 120 may be made from steel alloys. When turned by an input, the epicyclic gearbox 100 is effective to reduce the rotational speed of the sun gear 110 to a rotational speed appropriate for the load coupled to the ring gear 120.

Because each of the gear meshes (sun-to-planet and planet-to-ring) has a double-helical or "herringbone" gear tooth profile, there is no relative movement parallel to the axis A between the sun gear 110 and the planet gears 132, or between the planet gears 132 and the ring gear 120, or in other words there is no axial compliance between these elements.

The planet gears 132 are therefore configured and mounted in a manner to provide axial compliance between the carrier 131 and the planet gears 132.

The mounting of one planet gear 132 will be described as an example with the understanding that all of the planet gears 132 may be mounted in a same way. The carrier 131 includes a forward wall 140 and an aft wall 141, with coaxial bores 142 and 143, respectively. A pin 134 is received in the bores 142 and 143. The pin 134 may be hollow, generally cylindrical, and has forward and aft ends. The forward end includes a threaded, reduced-diameter surface 144 while the aft end includes an annular, radially-outwardly-extending flange 145. A retainer 146, in this example a threaded locknut, engages the reduced-diameter surface 144 to secure the pin 134 in position against rearward axial movement. The bearing 135 is disposed between the planet gears 132 and the pin 134, and comprises an inner race 136, an outer race 137, in this example the interior surface of the planet gear 132, and a plurality of rolling elements 138, each of the rolling elements 138 in contact with the inner race 136 and the outer race 137.

In the illustrated example, the inner race 136 is a single integral component incorporating pairs of raised guides 147 which define annular forward and aft raceways 148 and 149. The flange 145 of the pin 134 bears against the inner race 136 which in turn bears against the interior face of the forward wall 140 of the carrier 131. This secures the pin 134 against forward axial movement. The use of a single inner race 136 can provide for good concentricity between roller sets, but two separate inner races 136 could be used as well. The inner race 136 is sized so that it cannot move axially relative to the carrier 131.

The two annular raceways 148 and 149 receive rolling elements 138, in two tandem rings. The rolling elements 138 may comprise a ceramic material of a known composition, for example silicon nitride (Si3Ni4). In some other embodiments, there may be more than two raceways, with each raceway including a plurality of rolling elements 138. The rolling elements 138 may be configured as cylindrical rollers.

Figure 2:
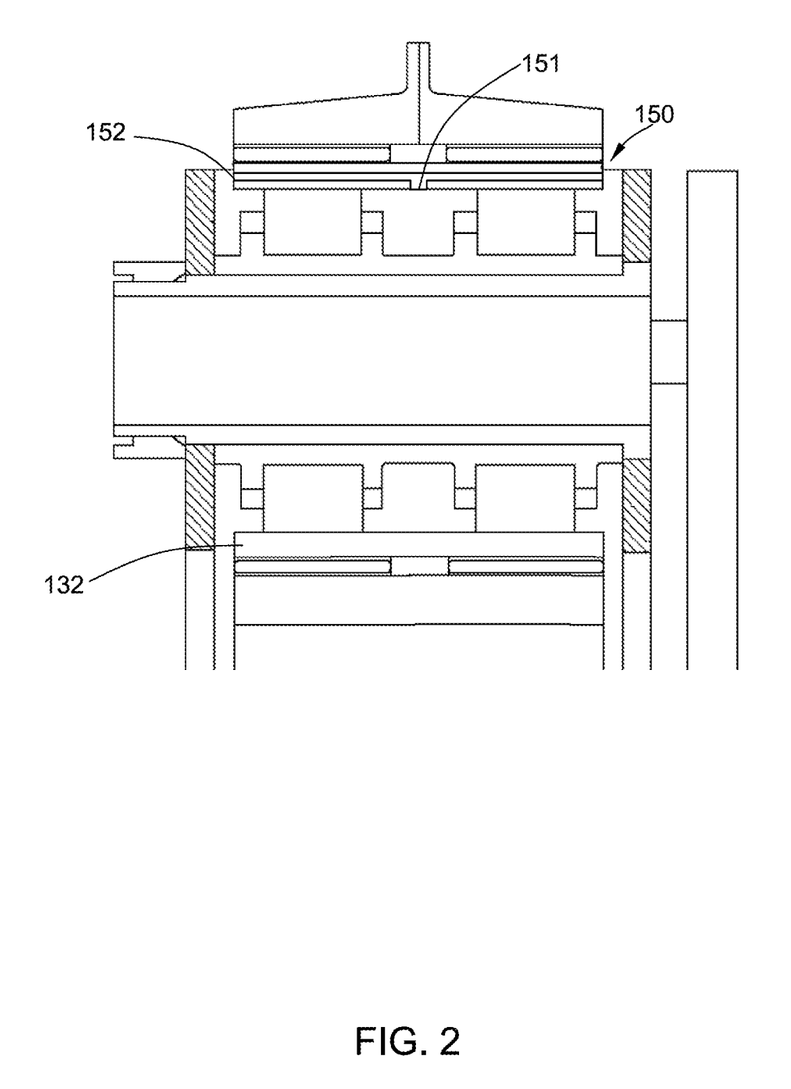
FIG. 2 is a detailed view, at an enlarged scale, of an upper part of the planetary gear of FIG. 1.
Figure 3:
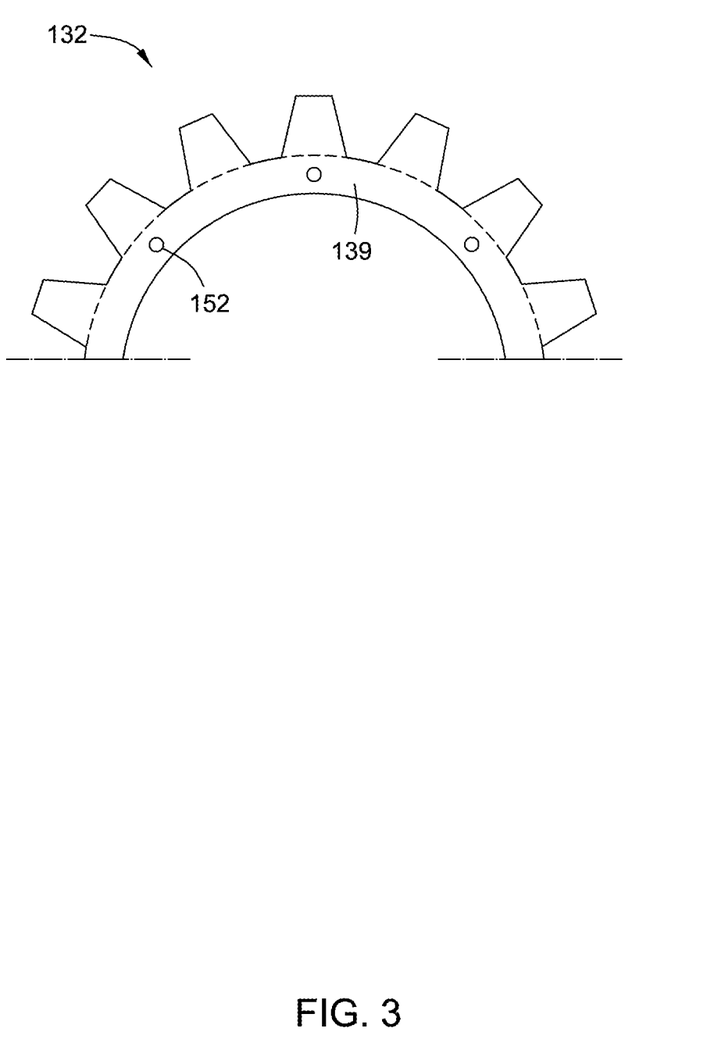
FIG. 3 is a partial detailed view of a coolant outlet of a cooling passage according to one embodiment of the present disclosure.
Figure 4:
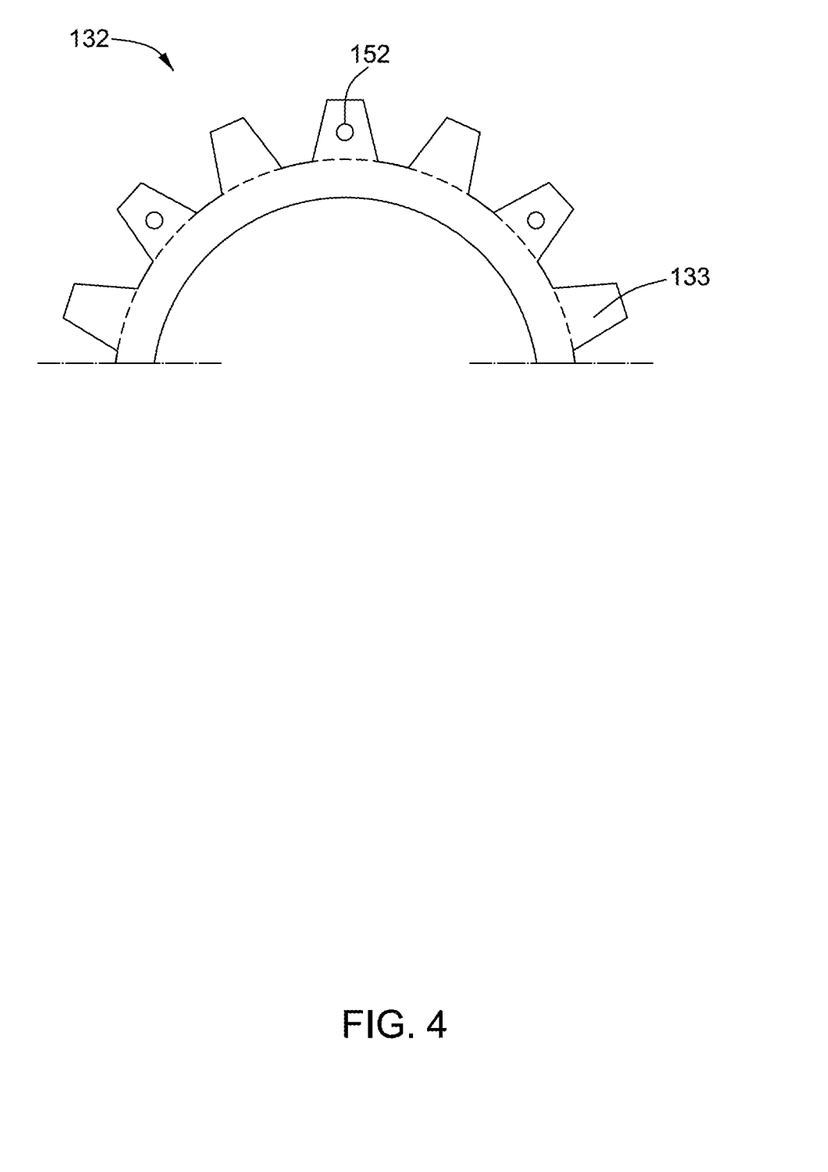
FIG. 4 is a partial detailed view of a coolant outlet of a cooling passage according to another embodiment of the present disclosure.

FIG. 2 illustrates an enlarged detailed view of an upper part of the planetary gear system 130 of FIG. 1. The planet gear 132 has a formed therein cooling passage 150 for allowing a coolant to pass therethrough to cool the planet gear 132. In some embodiments, the cooling passage 150 in the planet gear 132 comprises a coolant inlet 151 opened onto an inner surface of the planet gear 132. The cooling passage 150 may further comprise a coolant outlet 152 opened onto a lateral surface of the planet gear 132. The coolant outlet 152 of the cooling passage 150 may be below the root diameter of the planet gear 132, e.g. in the gear rim 139, as shown in FIG. 3, or above the root diameter of the planet gear 132, e.g. through the actual gear teeth 133 of planet gear 132, as shown in FIG. 4.

Figure 5:
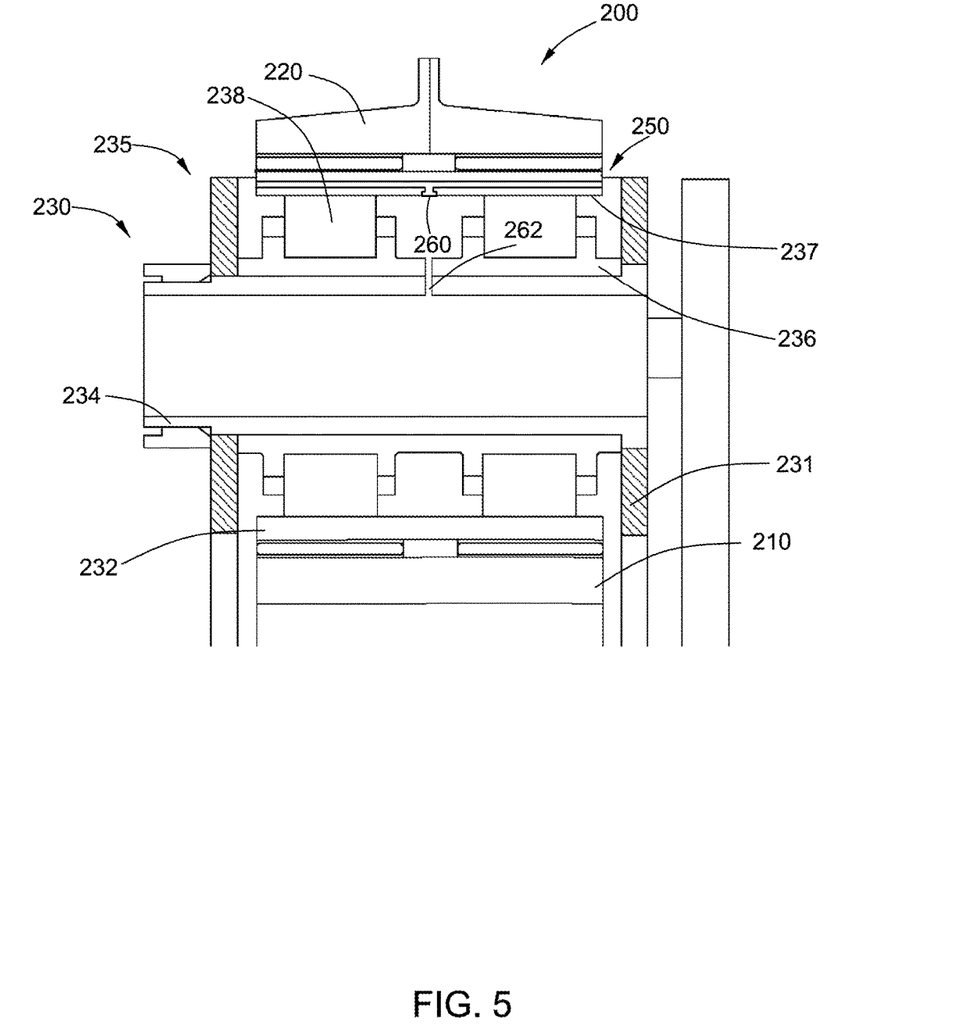
FIG. 5 is a detailed view, at an enlarged scale, of a planetary gear according to one embodiment of the present disclosure.

FIG. 5 illustrates a schematic sectional view of an upper part of an epicyclic gearbox 200 similar to the epicyclic gearbox 100 of FIG. 1. Similar to epicyclic gearbox 100, the epicyclic gearbox 200 comprises a sun gear 210, a ring gear 220 and a planetary gear system 230. The planetary gear system 230 comprises a carrier 231, a planet gear 232, a pin 234, and a bearing 235, which is disposed between the planet gear 232 and the pin 234, and comprises an inner race 236, an outer race 237 and a plurality of rolling elements 238. The planet gear 232 has a cooling passage 250 formed therein. The cooling passage 250 in the planet gear 232 is slightly different from the cooling passage 150, and it further comprises a coolant collection groove 260. In some embodiments, the coolant collection groove 260 annularly extends along the inner circumference of the planet gear 232. The coolant collection groove 260 may be located between the rows of roller elements 238.

The pin 234 may have a formed therein coolant distribution channel 262 to supply coolant to the cooling passage 250. The outlet of the coolant distribution channel 262 may be located between the rows of rolling elements 238. In some embodiments, the pin 234 has radial jets to supply coolant, through the coolant collection groove 260 located between the rows of roller elements 238, to the cooling passage 250. In some embodiments, the pin 234 is a hollow pin, and has a plurality of feed holes formed therein beside the coolant distribution channel 262. In operation, the coolant is fed to the interior of the hollow pin 234 and flows through the coolant distribution channel 262 and the feed holes for cooling the bearing 235, the gear and the outer race.

The coolant may pass through the coolant distribution channel 262 of the pin 234 to cool the bearing 235 and also pass through the cooling passage 250 to cool the gear and the outer race.

Figure 6:
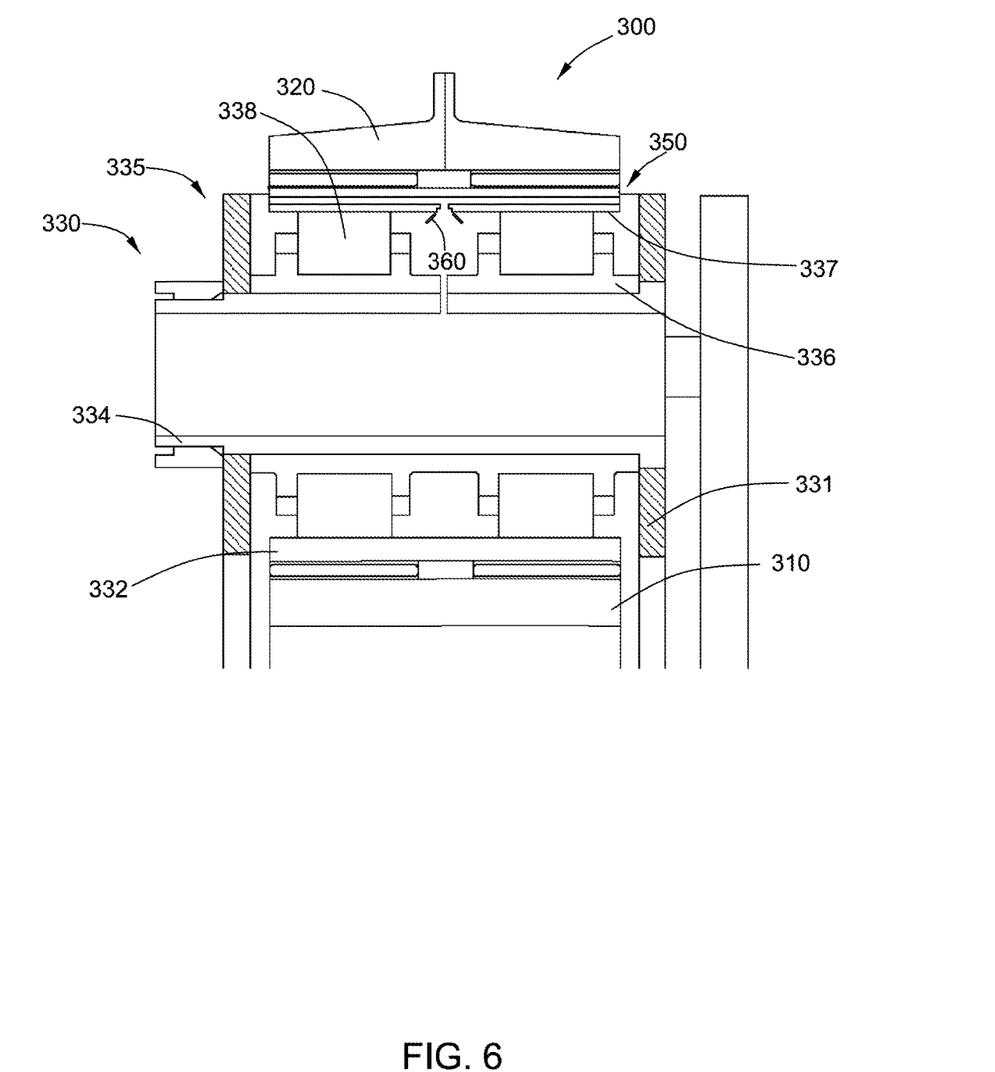
FIG. 6 is a detailed view, at an enlarged scale, of an upper part of a planetary gear according to another embodiment of the present disclosure.
Figure 7:
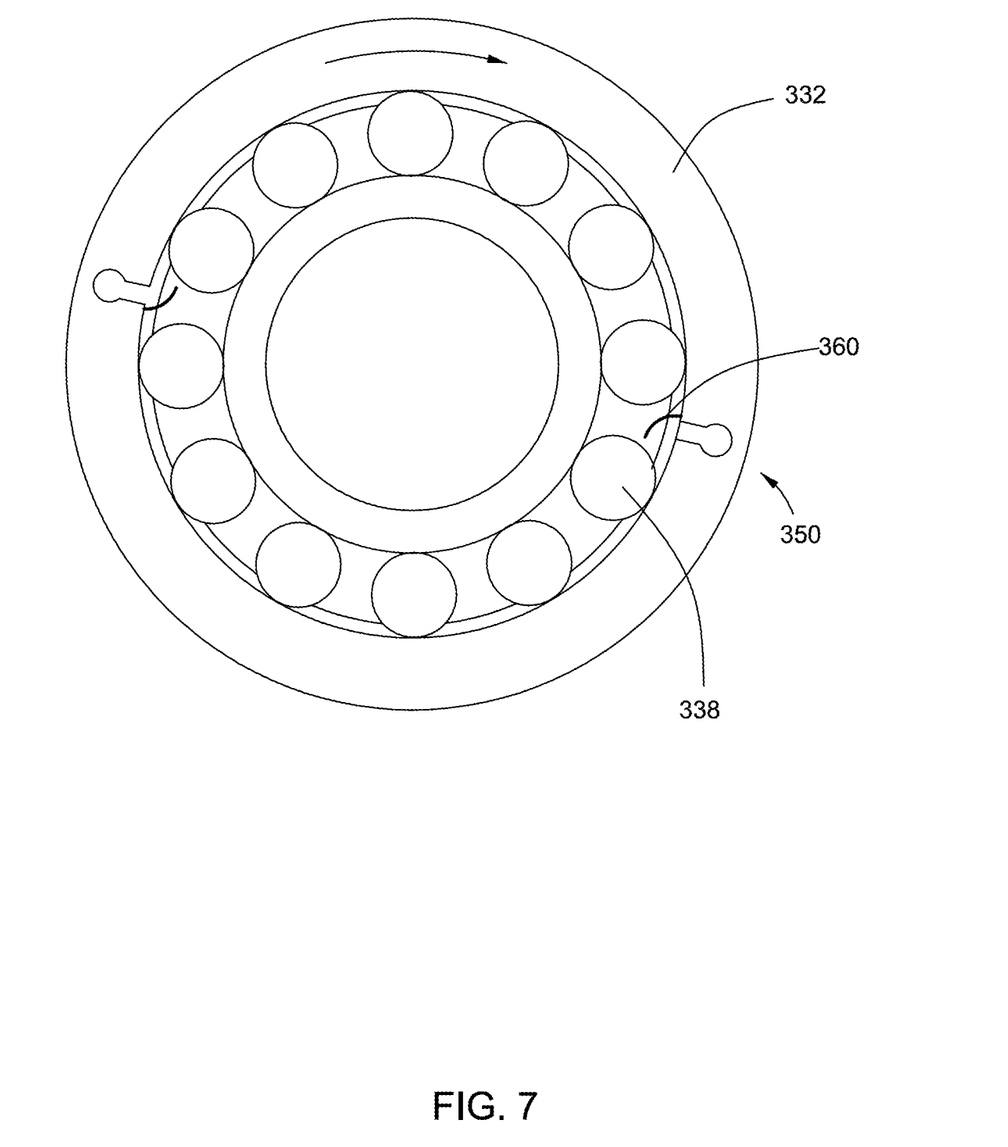
FIG. 7 is a section view, at an enlarged scale, of the planetary gear of FIG. 6.

FIGS. 6 & 7 illustrate an upper part of an epicyclic gearbox 300 similar to the epicyclic gearbox 200 of FIG. 5. Similar to epicyclic gearbox 200, the epicyclic gearbox 300 comprises a sun gear 310, a ring gear 320 and a planetary gear system 330. The planetary gear system 330 comprises a carrier 331, a planet gear 332, a pin 334, and a bearing 335, which is disposed between the planet gear 332 and the pin 334, and comprises an inner race 336, an outer race 337 and a plurality of rolling elements 338. The planet gear 332 has a cooling passage 350 formed therein. The cooling passage 350 in the planet gear 332 may be slightly different from the cooling passage 250, and it further comprises a deflector 360. The deflector 360 is positioned adjacent to the coolant inlet for orienting the coolant. The deflector 360 may be fixed on the outer race 337, for example, by welding, or may be integrally formed with the outer race 337, and the deflector 360 may be intermittent in a circumferential direction to allow the coolant to flow into the cooling passage 350. In some embodiments, the deflector 360 may be disk-shaped and centrally aligned with outer race 337.

The coolant may be lubrication oil providing both cooling and lubrication functions, e.g. lubricating the bearing, and passing through the cooling passage to cool the gear and the outer race.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A planetary gear system, comprising:
   a carrier;
   a planet gear defining a central planet axis;
   a pin coupling the planet gear to the carrier; and
   a bearing disposed between the planet gear and the pin, the bearing comprising an inner race, an outer race and a plurality of rolling elements, each of the rolling elements in contact with the inner race and the outer race,
   wherein the planet gear has formed therein at least one cooling passage comprising a coolant collection groove for allowing a coolant to pass therethrough to cool the planet gear.

2. The planetary gear system of claim 1, wherein the cooling passage in the planet gear comprises a coolant inlet opened onto an inner surface of the planet gear.

3. The planetary gear system of claim 1, wherein the cooling passage in the planet gear comprises a coolant outlet opened onto a lateral surface of the planet gear.

4. The planetary gear system of claim 1, wherein the coolant collection groove annularly extends along the inner circumference of the planet gear.

5. The planetary gear system of claim 1, wherein the pin has a formed therein coolant distribution channel to supply coolant to the cooling passage.

6. The planetary gear system of claim 1, wherein a deflector is positioned adjacent to the coolant inlet for orienting the coolant.

7. The planetary gear system of claim 6, wherein the deflector is intermittent in a circumferential direction.

8. The planetary gear system of claim 6, wherein the deflector is centrally aligned with the outer race.

9. The planetary gear system of claim 1, wherein the coolant is lubrication oil, the lubrication oil passing through the coolant distribution channel of the pin to lubricate the bearing.

10. The planetary gear system of claim 1, wherein the coolant collection groove is located between rows of roller elements.

11. An epicyclic gearbox comprising:
a planetary gear system comprising:
    a carrier;
    a planet gear defining a central planet axis;
    a pin coupling the planet gear to the carrier; and
    a bearing disposed between the planet gear and the pin, the bearing comprising an inner race, an outer race and a plurality of rolling elements, each of the rolling elements in contact with the inner race and the outer race,
wherein the planet gear has formed therein at least one cooling passage comprising a coolant collection groove for allowing a coolant to pass therethrough to cool the planet gear;
a sun gear rotating about a rotational center shaft; and
a ring gear being provided on the radially outer side of the sun gear,
wherein the planet gear of the planetary gear system being provided between the sun gear and the ring gear and meshes with the sun gear and the ring gear.

12. The epicyclic gearbox of claim 11, wherein the cooling passage in the planet gear comprises a coolant inlet opened onto an inner surface of the planet gear.

13. The epicyclic gearbox of claim 11, wherein the cooling passage in the planet gear comprises a coolant outlet opened onto a lateral surface of the planet gear.

14. The epicyclic gearbox of claim 11, wherein the coolant collection groove annularly extends along the inner circumference of the planet gear.

15. The epicyclic gearbox of claim 11, wherein the pin has a formed therein coolant distribution channel to supply coolant to the cooling passage.

16. The epicyclic gearbox of claim 11, wherein a deflector is positioned adjacent to the coolant inlet for orienting the coolant.

17. The planetary gear system of claim 16, wherein the deflector is intermittent in a circumferential direction.

18. The epicyclic gearbox of claim 16, wherein the deflector is centrally aligned with the outer race.

19. The epicyclic gearbox of claim 11, wherein the coolant is lubrication oil, the lubrication oil passing through the coolant distribution channel of the pin to lubricate the bearing.

20. The epicyclic gearbox of claim 11, wherein the coolant collection groove is located between rows of roller elements.

* * * * *